3,073,811

PROCESS FOR POLYMERIZING ALPHA-OLEFINS AND CATALYST FOR USE THEREIN

Giulio Natta, Italo Pasquon, and Ettore Giachetti, Milan, Italy
No Drawing. Filed Apr. 14, 1961, Ser. No. 102,938
22 Claims. (Cl. 260—93.7)

This invention relates to a new and improved process for polymerizing alpha-olefins of the formula $CH_2=CHR$, where R is a hydrocarbon radical, to high molecular weight, highly isotactic polymers, and to a new catalyst for promoting the polymerization.

It is known that when $TiCl_4$ is reacted with an aluminum alkyl such as triethyl aluminum, at low temperature, reduction of the $TiCl_4$ takes place, with formation of a mixture of different compounds and complexes, and that such mixture actively promotes the low-pressure polymerization of ethylene and diolefins when the polymerization is carried out in a hydrocarbon solvent in which the mixture is soluble.

Natta et al. have disclosed their discovery that catalysts prepared under given conditions from halides of transition metals of groups IV to VI of the periodic table (Mendeleeff) and alkyl compounds of metals of groups I to III of said table, promote the polymerization of propylene and other alpha-olefins, in a hydrocarbon solvent chemically inert to the catalyst, to a polymerizate comprising a mixture of head-to-tail high molecular weight macromolecules having different steric structures. Some of the macromolecules have a stereoregular structure which Natta has identified as the "isotactic" structure and others of the macromolecules have a random structure and are identified by Natta as linear, regular head-to-tail "atactic" macromolecules.

In general, catalysts of this type which are soluble in the hydrocarbon solvent in which the polymerization is carried out, and which are active promoters of ethylene and diolefin polymerization, have only a scarce activity in the polymerization of the alpha-olefins.

Natta et al. have also shown that, on the contrary, catalysts prepared from pure (violet) titanium trichloride and triethyl aluminum, and which are at least partially insoluble in the polymerization solvent, are more active in the polymerization of higher alpha-olefins and orient the polymerization to the production of polymerizates consisting prevailingly of macromolecules having substantially the Natta "isotactic" structure, i.e., macromolecules comprising the structure characterized in that supposing the macromolecular main chain fully extended in a plane, the groups bound to the tertiary asymmetric carbon atoms of adjacent monomeric units are on one side of the main chain, and the hydrogen atoms bound to those carbon atoms are on the opposite side of the chain.

The term "isotactic" defines the particular steric structure in the macromolecules of the alpha-olefin polymer and is not synonymous with "crystalline," since the isotactic structure persists whether the polymer is in a crystalline or non-crystalline state. Under appropriate conditions, the isotactic macromolecules are crystalline and isotactic polymers (i.e., polymers made up of isotactic macromolecules) are highly crystalline polymers.

Natta et al. have disclosed, further, that soluble catalysts obtained by reacting certain compounds of transition metals containing organic groups, such as alkoxides, acetylacetonates, etc. of the metals, with triethyl aluminum, while promoting the polymerization of ethylene, do not polymerize propylene in solution at practically acceptable rates, but that those catalysts are somewhat more satisfactory promoters of propylene polymerization when they are absorbed on a support having high absorptive characteristics, such as alumina, silica gel, etc.

However, even those supported catalyst systems have rather limited activity and, moreover, favor the production of prevailingly or exclusively atactic polymers.

Surprisingly we have now found that catalysts containing organo-metallic bonds, and consisting of the combination of an alkyl compound of a metal of groups II or III of the periodic table (Mendeleeff) in which the alkyl radicals contain from 2 to 16 carbon atoms and preferably triethylaluminum, a compound of a transition metal of groups IV to VI of said table which is soluble in hydrocarbon solvents and which when reacting with alkyl compounds yields products soluble in hydrocarbon solvents, a crystalline, insoluble, low valency halide of a metal of groups IV to VI of said table, such as titanium, zirconium, vanadium and chromium, are more active as promoters of alpha-olefin polymerization than any of the catalysts just described, and are highly stereospecific, orienting the polymerization to the production of polymerizates consisting prevailingly of isotactic macromolecules. These new catalysts exhibit extraordinarily high activity and, in general, remarkably increased stereospecificity, even when the amount of the soluble transition metal compound used is small. The soluble compound may be used in an amount of 5% to 50%, preferably 10%, by weight, based on the weight of the insoluble crystalline transition metal halide such as titanium dichloride, titanium trichloride, or $VCl_3$.

According to the present invention a molar ratio of the aluminum trialkyl to the insoluble compound in the range of 0.5:1 to 10:1, preferably 1:1 to 4:1 may be used.

It is noteworthy that the activity of the present catalysts is higher than the Natta et al. catalysts prepared from insoluble, crystalline titanium halides in which the titanium has a valency lower than the maximum valency corresponding to its position in the periodic table, and metal alkyls such as triethyl aluminum, which latter catalysts themselves exhibit good stereospecificity and activity, as Natta et al. have shown.

As noted above, the soluble catalysts prepared from the organometallic compounds of metals of groups II to III of the periodic table (Mendeleeff) and soluble compounds of transition metals of groups IV to VI of said table only exhibit any appreciable activity in the polymerization of alpha-olefins when those catalysts are adsorbed on a highly adsorptive support like silica gel or alumina. When used on the support, those catalysts orient the polymerization to the production of polymers having, prevailingly, the Natta atactic structure and which are non-crystallizable under any conditions. It is particularly noteworthy and unexpected, therefore, that the present catalysts prepared from the alkyl metal compound, soluble transition metal compound containing organic groups, and insoluble transition metal halides are not only highly active but exhibit, in spite of the increased activity thereof, an increased stereospecificity which is different from that of the former supported catalysts from soluble transition metal compounds and results in the production of the crude polymerizates comprising the high proportion of isotactic macromolecules.

This result can be explained by asuming that the crystalline, insoluble transition metal halides, which have per se no active centers for the polymerization of alpha-olefins or have only a relatively limited number of them, act as an adsorptive support for the soluble complexes resulting from the reaction of the metal alkyl and soluble transition metal compound. Such complexes which per se are practically without catalytic action, become active when they are chemically absorbed on the crystalline halide surface, or at any rate increase the number of active centers, or the activity of the centers already present on the surface of the titanium halide. Such stereospecificity is not acquired by the soluble complexes when they are adsorbed on an amorphous support, such as silica gel or alumina. In the latter case, the polymerization of the alpha-olefins is oriented to the production of atactic polymers.

We have further surprisingly found, that, not only crystalline insoluble, low valency halides of titanium, vanadium and chromium can act as an adsorptive support for the soluble complexes described, but that also solid halides of transition metals of the VIII group of the periodic table, which are insoluble in hydrocarbon solvents and which have an analogous crystalline structure, although being per se, in the presence of metal alkyls, inactive in the polymerization of the alpha-olefins, may be used as adsorptive supports for preparing the present catalysts. An example of such crystalline halides is cobaltous chloride.

Polymerization of the alpha-olefins with the present catalysts is carried out under normal atmospheric pressure or at somewhat increased pressure, e.g., at pressures up to 10 atmospheres or higher, at a temperature of 10° C. to 100° C. and in a hydrocarbon solvent which may be paraffinic or aromatic.

Titanium compounds which are soluble in the hydrocarbons used as polymerization solvent and which may be used in preparing the present catalysts include titanium alkoxides and monohalogeno-alkoxides, halogen-acetylacetonates of the type of titanium dichloro-acetylacetonate, acetyl acetonates such as titanium triacetylacetonate, acylhalogen compounds such as titanium chloride-acetates, alkoxy-acyl compounds such as alkoxyacetates, and dicyclopentadienyls like dichloro-dicyclopentadienyl titanium.

When the soluble transition metal compounds of the types mentioned are reacted with a metal alkyl which is preferably an aluminum alkyl in which the alkyl radicals contain from 2 to 16 carbon atoms, in the presence of a crystalline insoluble transition metal halide such as titanium trichloride, titanium dichloride, vanadium trichloride, chromium trichloride and cobaltous chloride, the activity of the resulting highly stereospecific catalysts is (after the first moments of the reaction), practically constant for many hours.

The results we have obtained by polymerizing alpha-olefins with the aid of a catalyst prepared from soluble titanium compounds in the presence of crystalline titanium trichloride or dichloride and triethyl aluminum are shown in Tables I and II, respectively.

From these tables, it is apparent that in some instances, using only 10% by weight of the soluble titanium compound (with respect to titanium chloride) the catalytic activity is increased up to 600% in relation to the activity which is observed when the catalyst is prepared from a crystalline titanium halide and an alkyl aluminum compound, only. Moreover, both the crystallinity and the molecular weight of the polymers obtained with the present catalyst system are always higher, or are always at least equal to, the crystallinity and molecular weight of the polymer obtained without the addition of soluble transition metal complexes to the reacting system.

The following examples are given to illustrate the invention, it being understood that these examples are not intended as limiting. In these examples, the pressure was kept constant throughout the reaction period by feeding the gaseous olefin continuously into the reactor. In this way, is was possible to follow the progress of the reaction with time and to determine that the reaction rate, after an initial state of a few tens of minutes during which it changes with time, reaches standard values, expressed in grams per hour of reacted monomer (i.e., of polymer produced) as shown in Tables I and II. This activity remains practically unchanged for many hours, if the free volume of the reacting system and the amount of solvent allow of a regular diffusion of the monomer on the catalyst surface, and if pure reactants are used.

EXAMPLE 1

The catalyst is prepared by introducing the insoluble crystalline titanium halide ($TiCl_2$), triethyl aluminum, the soluble titanium compound (e.g. titanium isopropylate, dichloro-dicyclopentadienyl-titanium, or titanium dichloro-diacetylacetonate) and 250 cc. of solvent (n-heptane or toluene) into a 500-cc. stainless steel oscillating autoclave under nitrogen. The autoclave is then evacuated and heated to the polymerization temperature. The gaseous monomer is introduced and the indicated partial pressure is then maintained constant.

In order to determine the polymerization rate, the run is stopped only after the polymerization rate has reached a value which is practically constant with the time.

The crude polymerizates are extracted with hot ether to separate an amorphous, atactic fraction, then with hot n-heptane to separate a partially crystalline, partially isotactic friction and leave a crystalline, isotactic residue. The results of the run are shown in Table I and compared with the results obtained using, with triethyl aluminum, only $TiCl_2$ or only the soluble titanium compound. The values for the intrinsic viscosity given in Table I were determined on the residue of the ether extraction.

Table I also gives the results of polymerization runs carried out with the use of triethyl aluminum and solid titanium halide only, but in an amount corresponding to about the sum of the weights of titanium halide and soluble titanium compound used in the other runs. The activity of the present catalyst systems is even more clearly apparent from a consideration of the results of the last-mentioned runs.

EXAMPLE 2

The run was carried out as in Example 1, except that titanium trichloride was used instead of titanium dichloride. The results are shown in Table II, which shows the same comparisons with runs performed under other conditions as are given in Table I.

EXAMPLE 3

A suspension of 0.20 g. crystalline $TiCl_3$ in n-heptane, a solution of 0.1 cc. $Ti(i-OC_3H_7)_4$ in n-heptane, and a solution of 1 cc. $Al(C_2H_5)_3$ in n-heptane are introduced under vacuum into a 2,000-cc. stainless steel vertical autoclave provided with a propeller stirrer and kept at 70° C., n-heptane being then added up to 500 cc. Stirring is initiated, and after ten minutes, gaseous propylene is introduced. The autoclave is kept under a pressure of 3 atm. during the entire reaction time. After 50 hours, the reaction is stopped. 175 g. of polypropylene having the following characteristics are obtained:

| | Percent |
|---|---|
| Amorphous | 16 |
| Partially crystalline | 5 |
| Crystalline | 79 |

A run carried out under the same conditions, but without the addition of the soluble alcoholate, gave an average production of 1.9 g./hour in the first 45 hours, that is, a production much lower than the average obtained in 50 hours using the catalyst according to this invention.

EXAMPLE 4

A suspension of 0.9 g. titanium trichloride in anhydrous n-heptane, a solution of 2 cc. aluminum diethyl monochloride, and a solution of 0.2 g. titanium tetraisopropylate in anhydrous n-heptane are introduced under vacuum in a shaking, stainless steel autoclave of 500-cc.

capacity. Additional anhydrous n-heptane is introduced up to a total of 250 cc. The autoclave is brought to the polymerization temperature (70° C.) and gaseous propylene is introduced up to a pressure of 1000 mm. mercury above atmospheric pressure, the pressure being kept constant for the entire duration of the run.

After 7 hours, 15.5 g. of polymerizate are obtained.

Operating under similar conditions, but in the absence of titanium alcoholate, only 11.9 g. of polymerizate are obtained.

The intrinsic viscosities of the fractions of the polymerizates, which are insoluble in cold-n-heptane, are respectively (in tetralin at 135° C.) 3.75 and 3.5, in both cases.

TABLE III

*Polymerization of butene-1 with the aid of 1.5 g. $TiCl_3$ and 2 cc. $Al(C_2H_5)_3$ in n-heptane at 15° C. and atmospheric pressure. Duration: 18 hours.*

| Run | Obtained polybutene, g. | Acetone | Percent soluble in— | | | [η] of other extract | [η] of residue after ether extraction |
|---|---|---|---|---|---|---|---|
| | | | Ethyl ether | Hexane | n-Heptane | | |
| 1[1] | 25.5 | 1.8 | 16.3 | 23 | 58.8 | 1.58 | 6.9 |
| 2 | 10.4 | 1 | 24.6 | 74.3 | 0 | N.d. | 3.24 |

[1] 0.4 g. titanium isopropylate added.

TABLE I

*Polymerization of Propylene to Isotactic Polymers With Soluble Titanium Compounds, Crystalline Titanium Dichloride and Triethyl Aluminum (Triethyl Aluminum Used in Each Run: 2 cc.)*

| Crystalline halide ($TiCl_2$), g. | Soluble titanium compound, g. | Temp., °C. | $C_3H_6$ pressure mm. Hg (abs.)[1] | Solvent, 250 cc. | Standard absorption rate, g. $C_3H_6$ per hour | Reaction time, hours | Total polymer produced, g. | Amorphous[1] | Partially crystalline[1] | Highly crystalline[1] | Intrinsic viscosity of the partially cryst. plus highly cryst. fraction, 100 cc./g. |
|---|---|---|---|---|---|---|---|---|---|---|---|
| | $Ti(i-OC_3H_7)_4$ 0.135 | 70 | 2,450 | n-Heptane | 0 | 6 | 0 | ---- | ------ | ------ | ------ |
| 1.2 | | 70 | 2,450 | ---do------ | 4.9 | 3 | 12.1 | 15.6 | 8 | 76.4 | 3.25 |
| 1.2 | $Ti(i-OC_3H_7)_4$ 0.135 | 70 | 2,450 | ---do------ | 7.5 | 3 | 21.0 | 15.0 | 8 | 77.0 | 3.25 |
| 1.35 | | 70 | 2,450 | ---do------ | 5.4 | 3 | 13.5 | 15.4 | 7.8 | 76.8 | 3.26 |
| | $TiCl_2(C_5H_5)_2$ 0.165 | 70 | 1,450 | Toluene | 0 | 6 | 0 | ---- | ------ | ------ | ------ |
| 1.2 | | 70 | 1,450 | ---do------ | 2.7 | 3 | 3.95 | 13.0 | 7.5 | 79.5 | 3.40 |
| 1.2 | $TiCl_2(C_5H_5)_2$ 0.165 | 70 | 1,450 | ---do------ | 13.5 | 3 | 24.60 | 12.5 | 7.4 | 80.1 | 4.40 |
| 1.4 | | 70 | 1,450 | ---do------ | 3.1 | 3 | 4.5 | 13.2 | 7.5 | 9.3 | 3.38 |
| | $TiCl_2(C_5H_7O_2)_2$ 0.3 | 70 | 1,450 | ---do------ | 0 | 6 | 0 | ---- | ------ | ------ | ------ |
| 1.2 | $TiCl_2(C_5H_7O_2)_2$ 0.3 | 70 | 1,450 | ---do------ | 8.2 | 3 | 24.7 | 14.0 | 8 | 78 | ------ |

[1] Constant for the duration of the reaction.

TABLE II

*Polymerization of Propylene to Isotactic Polymers With Soluble Titanium Compounds, Crystalline Titanium Trichloride and Triethyl Aluminum (Triethyl Aluminum Used in Each Run: 2 cc.)*

| Crystalline halide ($TiCl_3$), g. | Soluble titanium compound $Ti(i-OC_3H_7)_4$, g. | Temp., °C. | $C_3H_6$ pressure, mm. Hg (abs.)[1] | Solvent, 250 cc. | Equilibrium absorption rate, g. $C_3H_6$ per hour | Reaction time, hours | Total polymer produced, g. | Amorphous[1] | Partially crystalline[1] | Highly crystalline[1] | Intrinsic viscosity of the part. cryst. plus highly cryst. fraction, 100 cc./g. |
|---|---|---|---|---|---|---|---|---|---|---|---|
| | 0.09 | 70 | 1,450 | n-Heptane | 0 | 6 | 0 | ---- | ------ | ------ | ------ |
| 0.798 | | 70 | 1,450 | ---do------ | 8.4 | 2 | 14.3 | 15.0 | 6.8 | 78.2 | 2.75 |
| 0.798 | 0.09 | 70 | 1,450 | ---do------ | 15.1 | 2 | 29.9 | 13.6 | 4.5 | 81.9 | 3.30 |
| | 0.36 | 70 | 450 | ---do------ | 0 | 6 | 0 | ---- | ------ | ------ | ------ |
| 0.798 | | 70 | 450 | ---do------ | 2.5 | 2 | 4.3 | 13.4 | 6.1 | 80.5 | 2.68 |
| 0.798 | 0.36 | 70 | 450 | ---do------ | 9.7 | 2 | 16.5 | 11.1 | 4.4 | 84.5 | 3.16 |
| 0.798 | 0.36 | 70 | 450 | ---do------ | 9.6 | 4 | 34.9 | 10.9 | 3.7 | 85.4 | 3.20 |
| 1.15 | | 70 | 450 | ---do------ | 3.6 | 2 | 6.3 | 13.0 | 6.3 | 80.7 | 2.65 |
| 1.15 | | 70 | 450 | ---do------ | 3.5 | 4 | 13.2 | 12.6 | 6.2 | 81.2 | 2.70 |

[1] Constant for the duration of the reaction.

EXAMPLE 5

1.5 g. titanium trichloride, 0.4 g. titanium tetraisopropylate and 2 cc. triethyl aluminum are introduced in a shaking stainless steel autoclave of 500 cc. capacity under nitrogen.

The titanium alcoholate and the aluminum alkyl are added in solution in anhydrous n-heptane, the total amount of solvent being 100 cc. The autoclave is evacuated and the temperature is adjusted to 15° C.; thereafter gaseous 1-butene is introduced up to atmospheric pressure, which is kept constant for the duration of the run.

After 18 hours, 25.5 g. polymerizate are obtained which are extracted successively with the following hot solvents: acetone, ethyl ether, hexane, and heptane.

In Table III below is shown the results obtained in comparison with a run carried out without titanium alcoholate.

EXAMPLE 6

0.55 g. vanadium trichloride, 0.06 g. vanadium triacetyl acetonate and 0.6 cc. aluminum triethyl are introduced into a shaking stainless steel autoclave of 500 cc. capacity in a nitrogen atmosphere.

Vanadium acetyl acetonate and aluminum triethyl are added in solution in anhydrous benzene, the solvent used amounting in total to 250 cc. The autoclave is evacuated and brought to 70° C., which temperature is kept constant for the duration of the run.

Gaseous propylene is then fed in up to a pressure of 500 mm. of mercury above the normal pressure, which is kept constant for the entire polymerization. After 2½ hours, 11.5 g. of polymerizate are obtained and extracted in succession with hot ether and hot n-heptane.

Table IV below gives the results obtained, in comparison with the run carried out under the same conditions but carried out in the absence of vanadium acetyl acetonate.

TABLE IV

*Propylene polymerization with the aid of 0.25 g. TiCl$_3$ and 0.6 cc. Al(C$_2$H$_5$)$_3$ in benzene at 70° C. and Propylene pressure (abs.) 700 mm. Hg. Duration: 2½ hours*

| Run | Obtained polymerizate, g. | Percent soluble in— | | Residue after n-heptane extraction, percent | [η] of residue after ether extraction |
|---|---|---|---|---|---|
| | | Ether | n-Heptane | | |
| 1[1] | 11.5 | 19.2 | 4.0 | 76.8 | 3.38 |
| 2 | 9.7 | 30.2 | 5.5 | 64.0 | 3.20 |

[1] 0.06 g. vanadium triacetyl acetonate added.

EXAMPLE 7

A suspension of 1.2 g. titanium dichloride in anhydrous n-heptane, a solution of 0.15 g. chromium acetylacetonate and a solution of 2 cc. triethyl aluminum in n-heptane, the total volume of solvent being 250 cc. are introduced into a 500-cc. shaking autoclave. The temperature is brought to 70° C. and gaseous propylene is added up to a pressure of 1450 mm. mercury. Polymerization is carried out for 3½ hours. At the end of this time the reaction is stopped and 11.5 g. polypropylene are obtained having the following characteristics: Amorphous=13.5% (soluble in hot ethyl ether). The residue of the extraction with hot ethyl ether has an intrinsic viscosity of 3.9.

Operating in similar way, without the addition of chromium acetylacetonate, only about 5 g. of crude polymerizate are obtained under the same conditions.

EXAMPLE 8

The catalyst is prepared introducing the insoluble crystalline halide (cobaltous chloride or chromium trichloride), triethylaluminum, the soluble titanium compound (titanium isopropylate) and 250 cc. n-heptane into a 500-cc. stainless steel shaking autoclave in nitrogen atmosphere.

The autoclave is then evacuated and heated to the polymerization temperature (70° C.) and gaseous propylene up to an absolute pressure of 1450 mm. mercury which is then kept constant.

After 18 hours, the polymerization is stopped and the reaction product is extracted and purified as usual.

The purified polymerizate is then extracted in succession in boiling ether and n-heptane.

In Table V results of polymerization runs carried out using cobaltous or chromium chlorides supports are given.

TABLE V

*Polymerization of propylene with catalysts from titanium isopropylate, dicobaltous chloride or chromium trichloride and triethyl aluminum*

| Run | Crystalline chloride, g. | Ti(i-OC$_3$H$_7$)$_4$, g. | Al(C$_2$H$_5$)$_3$, cm.$^3$ | Duration, hours | Total polymer, g. | Extraction | | |
|---|---|---|---|---|---|---|---|---|
| | | | | | | Soluble in ether, percent | Soluble in n-heptane, percent | Residue, percent |
| 1 | CoCl$_2$, 3.15 | 1.2 | 2 | 18 | 16.6 | 46.8 | 12.6 | 40.6 |
| 2 | CrCl$_3$, 0.867 | 0.36 | 2 | 18 | 11.25 | 42.3 | 19 | 38.7 |
| 3 | CoCl$_2$, 3.15 | | 2 | 18 | | | | |
| 4 | CrCl$_3$, 0.867 | | 2 | 18 | | | | |
| 5 | | 1.2 | 2 | 18 | 0.44 | 30.2 | N.d. | N.d. |

EXAMPLE 9

0.39 g. of alpha-TiCl$_3$, 1.16 g. aluminum triethyl, 0.039 g. titanium triacetyl acetonate and 200 cc. toluene are introduced into a 500-cc. autoclave which is heated to 70° C., and kept at this temperature. Propylene is then added, up to a relative pressure of 1500 mm. (Hg) which pressure is also kept constant during the run. The polymerization is stopped after 3½ hours.

A similar run is carried out, omitting the Ti triacetylacetonate. The results obtained are as follows:

| Polymerizate obtained, g. | Intrinsic viscosity | Fractions obtained by extraction of the crude with boiling solvents | | |
|---|---|---|---|---|
| | | Ether, percent | n-Heptane, percent | Residue, percent |
| With TiAc$_3$, 28.7 | 3.56 | 7.7 | 6.9 | 85.4 |
| Without TiAc, 16.2 | 3.21 | 9.2 | 6.9 | 83.9 |

Note.—TiAc$_3$—Titanium triacetylacetonate.

EXAMPLE 10

0.61 g. of gamma TiCl$_3$, 0.8 g. aluminum triethyl, 0.03 g. titanium triacetylacetonate and 200 cc. toluene are introduced into the autoclave of Example 9. After heating to 70° C., propylene is added up to a relative pressure of 500 mm. (Hg). Temperature and pressure are kept constant during the run which lasts 70 minutes.

A similar run is carried out, omitting the titanium triacetylacetonate. The results obtained are as follows:

| Polymerizate obtained, g. | Intrinsic viscosity | Fractions obtained by extraction of the crude with boiling solvents | | |
|---|---|---|---|---|
| | | Ether, percent | n-Heptane, percent | Residue, percent |
| With TiAc$_3$, 18.5 | 3.7 | 10.5 | 6.2 | 83.3 |
| Without TiAc$_3$, 13.2 | 3.4 | 11.2 | 8.8 | 80.0 |

Similar results are obtained upon using as the soluble transition metal component, the other soluble transition metal compounds of the present invention such as those selected from the alkoxides, halogen alkoxides, halogen acetylacetonates, acetylacetonates, chloroacetates, alkoxy acetates and the chloro-dicyclopentadienyls of vanadium, zirconium and chromium.

Results similar to those shown in the working examples are also obtained when the corresponding alkyls of beryllium are utilized in place of the alkyls of aluminum. In this case, polymerizates consisting essentially of isotactic macromolecules are obtained.

The present catalysts are effective promotors of the polymerization of the alpha-olefins CH$_2$=CHR in which R is a hydrocarbon radical containing from 1 to 16 carbon atoms.

The stability of these new catalysts, which is manifested in the continued, constant activity of the catalysts over many hours after the first moments of the reaction, is in marked contrast to the progressive loss of activity generally observed with catalysts prepared from heavy metal compounds and metal alkyls.

Some changes and variations may be made in details in practicing the invention, without departing from the spirit thereof, and we intend to include in the scope of the appended claims all such modifications as may be apparent to those skilled in the art.

The present application is a continuation-in-part of application Serial No. 716,527, filed February 21, 1958.

Having thus described the present invention, what it is desired to secure and claim by Letters Patent is:

What is claimed is:

1. A process for polymerizing alpha-olefins of the formula $CH_2=CHR$ wherein R is a hydrocarbon radical, to high molecular weight linear polymers, which process comprises polymerizing the monomer in a hydrocarbon solvent and in contact with a catalyst containing organometallic bonds and consisting of the combination of
   (1) a transition metal compound soluble in the hydrocarbon solvent and selected from the group consisting of alkoxides, monohalo-alkoxides, halo-acetylacetonates, acetylacetonates, halo-acyl compounds, alkoxy-acyl compounds and dicyclopentadienyls of titanium, vanadium, zirconium and chromium,
   (2) an alkyl compound of a metal of groups II and III of the Mendeleeff periodic table in which the alkyl groups contain from 2 to 16 carbon atoms, said transition metal compound of (1) being further characterized in that by reaction with the said metal alkyl compound of (2), it yields products soluble in the hydrocarbon solvent, and (3) a solid, crystalline low valency halide selected from the group consisting of halides of titanium, zirconium, vanadium, chromium and cobalt in which halide the metal has a valence not higher than 3, said halide being further characterized in that when mixed with the said metal alkyl compound of (2), it yields products which are at least partially insoluble in the hydrocarbon solvent.

2. A process according to claim 1, characterized in that the catalyst contains from 5% to 50% by weight of the hydrocarbon soluble transition metal compound, based on the weight of the crystalline low valency metal halide, the molar ratio of the metal alkyl compound to the crystalline low valency halide is from 0.5:1 to 10:1, and the polymerization of the monomer in contact with the catalyst is carried out at a temperature of about 10° C. to about 100° C. and under a pressure of from normal atmospheric pressure to 10 atmospheres pressure.

3. A process according to claim 1, wherein the catalyst consists of a hydrocarbon soluble alkoxide of (1), a metal alkyl compound of (2) and a solid, crystalline low valency halide of (3).

4. A process according to claim 1, wherein the catalyst consists of a hydrocarbon soluble mono-halo-alkoxide of (1) a metal alkyl compound of (2) and a solid crystalline low valency halide of (3).

5. A process according to claim 1, wherein the catalyst consists of a hydrocarbon soluble halo-acetylacetonate of (1), a metal alkyl compound of (2) and a solid crystalline low valency halide of (3).

6. A process according to claim 1, wherein the catalyst consists of a hydrocarbon soluble acetylacetonate of (1), a metal alkyl compound of (2) and a solid crystalline low valency halide of (3).

7. A process according to claim 1, wherein the catalyst consists of a hydrocarbon soluble halo-acyl compound of (1), a metal alkyl compound of (2) and a solid crystalline low valency halide of (3).

8. A process according to claim 1, wherein the catalyst consists of a hydrocarbon soluble alkoxy-acyl compound of (1), a metal alkyl compound of (2) and a solid crystalline low valency halide of (3).

9. A process according to claim 1, wherein the catalyst consists of a dicyclopentadienyl of (1), a metal alkyl compound of (2) and a solid crystalline low valency halide of (3).

10. A process according to claim 1, wherein the catalyst consists of a titanium compound of (1), a metal alkyl compound in which the alkyls contain from 2 to 16 carbon atoms and selected from the group consisting of aluminum and beryllium alkyl compounds, and a solid crystalline low valency halide of (3).

11. A process according to claim 1, wherein the catalyst consists of a vanadium compound of (1), a metal alkyl compound in which the alkyls contain from 2 to 16 carbon atoms and selected from the group consisting of aluminum and beryllium alkyl compounds and a solid, crystalline low valency halide of (3).

12. A process according to claim 1, wherein the catalyst consists of a chromium compound of (1), a metal alkyl compound in which the alkyls contain from 2 to 16 carbon atoms and selected from the group consisting of aluminum and beryllium alkyl compounds and a solid, crystalline low valency halide of (3).

13. A process according to claim 1, wherein the catalyst consists of a titanium compound of (1), triethyl aluminum and solid, crystalline titanium dichloride.

14. A process according to claim 1, wherein the catalyst consists of a titanium compound of (1), triethyl aluminum and solid, crystalline titanium trichloride.

15. A process according to claim 1, wherein the catalyst consists of a titanium compound of (1), diethyl aluminum monochloride and solid, crystalline titanium dichloride.

16. A process according to claim 1, wherein the catalyst consists of a titanium compound of (1), diethyl aluminum monochloride and solid, crystalline titanium trichloride.

17. A process according to claim 1, wherein the catalyst consists of a vanadium compound of (1), triethyl aluminum and solid, crystalline vanadium trichloride.

18. A process according to claim 1, wherein the catalyst consists of a chromium compound of (1), triethyl aluminum and a solid, crystalline titanium chloride.

19. A process according to claim 1, wherein the catalyst consists of a titanium compound of (1), triethyl aluminum and solid, crystalline cobaltous chloride.

20. A process according to claim 1, wherein the catalyst consists of titanium dihalo-dicyclopentadienyl, an aluminum alkyl and solid, crystalline titanium trichloride.

21. A process according to claim 1, wherein the catalyst consists of titanium triacetylacetonate, an aluminum alkyl and solid, crystalline titanium trichloride.

22. A process according to claim 1, wherein the catalyst consists of titanium tetraisopropylate, an aluminum alkyl and solid, crystalline titanium trichloride.

No references cited.

UNITED STATES PATENT OFFICE
CERTIFICATE OF CORRECTION

Patent No. 3,073,811                      January 15, 1963

Giulio Natta et al.

It is hereby certified that error appears in the above numbered patent requiring correction and that the said Letters Patent should read as corrected below.

In the grant, lines 1 and 2, for "Giulio Natta, Italo Pasquon, and Ettore Giachetti, of Milan, Italy," read -- Giulio Natta, Italo Pasquon, and Ettore Giachetti, of Milan, Italy, assignors to Montecatini Societa Generale per l'Industria Mineraria e Chimica, of Milan, Italy, --; line 11, for "Giulio Natta, Italo Pasquon, and Ettore Giachetti, their heirs" read -- Montecatini Societa Generale per l'Industria Mineraria e Chimica, its successors --; in the heading to the printed specification, lines 4 and 5, for "Giulio Natta, Italo Pasquon, and Ettore Giachetti, Milan, Italy" read -- Giulio Natta, Italo Pasquon, and Ettore Giachetti, Milan, Italy, assignors to Montecatini Societa Generale per l'Industria Mineraria e Chimica, Milan, Italy --.

Signed and sealed this 20th day of August 1963.

(SEAL)
Attest:
ERNEST W. SWIDER
Attesting Officer

DAVID L. LADD
Commissioner of Patents